Figure 1:
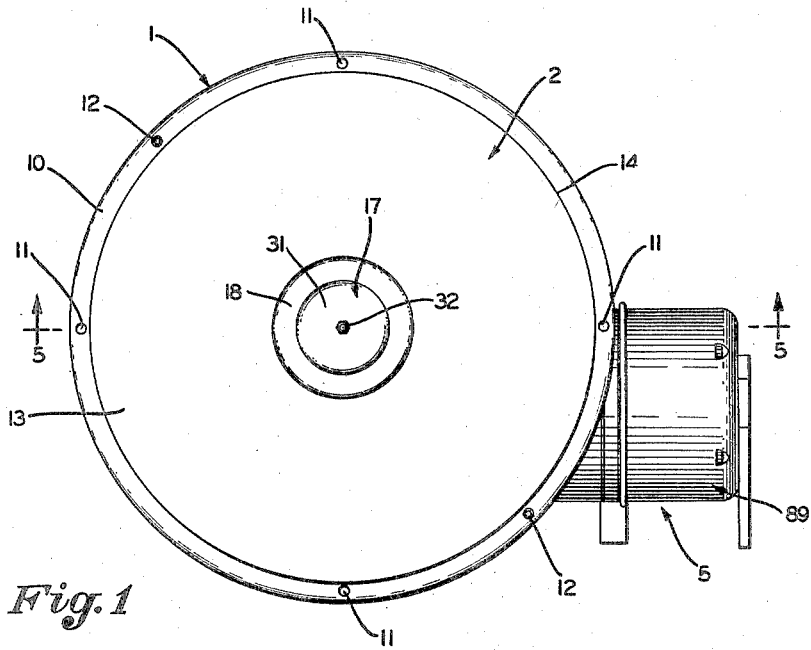

Aug. 7, 1956  A. J. CARPENTER  2,757,559
INDEXING TABLE CONSTRUCTION
Filed March 3, 1955  4 Sheets-Sheet 1

INVENTOR.
Albert J. Carpenter
BY Frease & Bishop
ATTORNEYS

Aug. 7, 1956  A. J. CARPENTER  2,757,559
INDEXING TABLE CONSTRUCTION
Filed March 3, 1955  4 Sheets-Sheet 2

INVENTOR.
Albert J. Carpenter
BY
Frease & Bishop
ATTORNEYS

Aug. 7, 1956 A. J. CARPENTER 2,757,559
INDEXING TABLE CONSTRUCTION
Filed March 3, 1955 4 Sheets-Sheet 3
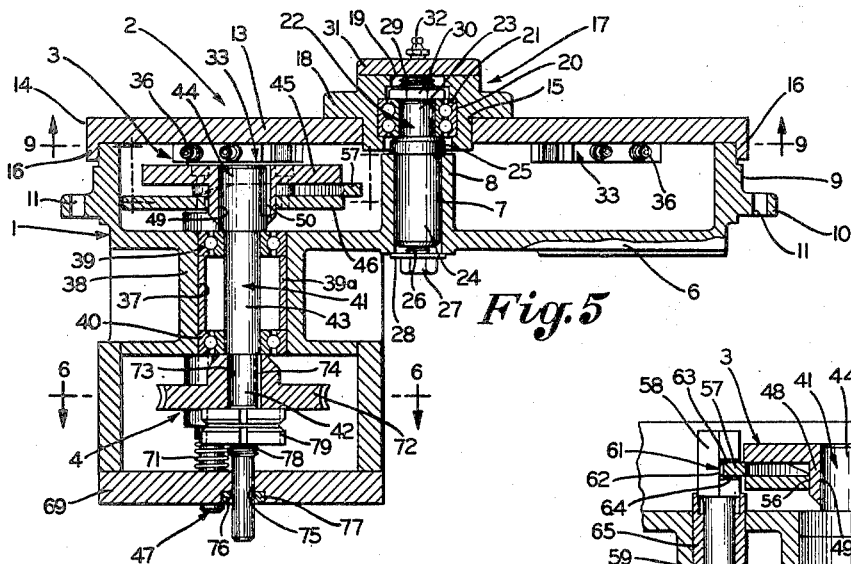
INVENTOR.
Albert J. Carpenter
BY
Frease & Bishop
ATTORNEYS Aug. 7, 1956  A. J. CARPENTER  2,757,559
INDEXING TABLE CONSTRUCTION
Filed March 3, 1955  4 Sheets-Sheet 4

INVENTOR.
Albert J. Carpenter
BY Frease & Bishop
ATTORNEYS

United States Patent Office 2,757,559
Patented Aug. 7, 1956

2,757,559

INDEXING TABLE CONSTRUCTION

Albert J. Carpenter, Canton, Ohio, assignor to The Cleveland Tapping Machine Company, Canton, Ohio, a corporation of Ohio Application March 3, 1955, Serial No. 491,975

10 Claims. (Cl. 74—820)

My invention relates to improvements in indexing tables for use with machine tools. More specifically, my invention relates to an indexing table construction which includes a new and unique arrangement of a Geneva drive.

Some prior indexing table constructions have included a horizontally mounted circular driving plate with a driving roller mounted projecting from the flat top surface of the plate and near the outer circular periphery of the plate. As the driving plate is rotated, the driving roller engages slots formed in an adjacent horizontally mounted circular driven plate which is connected to a shaft on which is mounted a circular indexing table. This motion of the driving roller in the slots formed in the driven plate rotates the table and constitutes essentially a standard Geneva drive.

Frequently, the bottom side of the driving plate is provided with a cam surface near the outer periphery of this driving plate. A second roller or follower is mounted vertically and bears against this cam surface by means of spring loading. This second cam roller is in turn connected to a shot bolt or stop pin which engages in holes formed in the bottom surface of the indexing table or the bottom surface of the slotted driven plate. This serves to retain the indexing table at one particular position between the driving movements caused by the driving roller in the slotted driven plate.

One of the principal difficulties of the above indexing table construction and all other prior indexing table drives is that there is always an interval at the end of the driving cycle and before the shot bolt or stop pin engagement when the indexing table is completely disengaged from either the driving plate or the stop pin. At this time, the indexing table can be freely rotated and if such accidental motion is imparted to the indexing table, any workpieces carried thereon will be carried out of position with the machine tools. This can cause extensive damage to the machine tools as well as result in work parts which have not had the necessary operations performed on them.

This above difficulty is further aggravated by the shot bolt or stop pin being merely spring loaded, that is, only having a spring force retaining the stop pin follower mechanism in engagement with the cam surface on the driving plate. In such a construction, if for any reason the shot pin should stick momentarily and consequently slow up the movement of the stop pin into the engagement holes on the table or the driven plate, the interval of possible free movement of the indexing table will be greatly increased. Additionally, if the stop pin should stick altogether the indexing table may never be engaged by the stop pin.

Another difficulty of this prior construction and other prior constructions is that all the parts of the driving and driven plates, slots, rollers and engagement holes must be very closely machined not only separately but in relation to each other. For instance, the engagement holes on the indexing table or the driven plate must be very closely positioned and machined in relation to the driving roller mounted on the driving plate and the slots formed in the driven plate in order to minimize the amount of time in which the indexing table may be freely rotated. Additionally, a slight amount of wear on any of these parts will increase this interval of free movement of the indexing table.

It is therefore a general object of the present invention to provide an indexing table construction which eliminates the difficulties of the prior art.

It is a primary object of the present invention to provide an indexing table construction in which the indexing table is at all times positively engaged and can never be freely rotated.

It is a further object of the present invention to provide an indexing table construction in which the shot bolt or stop pin is positively driven and is not at any time dependent on spring motion for its engagement or disengagement motion.

It is still a further object of the present invention to provide an indexing table construction in which the stop pin engages in the same slots as the driving roller so that the indexing table can never get out of timing.

It is another object of the present invention to provide an indexing table construction in which a single cam and drive plate assembly positively controls both the driving roller and the stop pin.

Finally, it is an object of the present invention to provide an indexing table construction which accomplishes all of the above objects, but yet is simple in construction and economical to manufacture.

These and other objects are accomplished by the parts, constructions, arrangements, combinations and sub-combinations comprising the present invention, the nature of which is set forth in the following general statement, a preferred embodiment of which—illustrative of the best mode of which applicant has contemplated applying the principles—is set forth in the following description and illustrated in the accompanying drawings and which is particularly and distinctly pointed out and set forth in the appended claims forming a part hereof.

In general terms the improved indexing table construction may be stated as including a rotatable table, engagement means mounted on the table, a driving plate assembly having a cam portion, a driving element mounted on the driving plate assembly and engageable with the engagement means on the table, and stop means engaged with the cam portion on the driving plate assembly and engageable with the same driving element engagement means on the table.

More specifically, the improved indexing table construction constituting the present invention may be stated as including a preferably horizontal circular driving plate assembly having a top surface and a cam portion formed on its outer annular edge, a driving roller mounted on the top surface of the driving plate assembly and adjacent the outer annular edge, a driven table having a bottom surface, pairs of spaced radially extending engagement members mounted circumferentially equally spaced on the bottom surface of the driven table, the driving roller intermittently engaged between a pair of engagement members to impart intermittent rotational movements to the driven table, a preferably vertical stop member slidably positively engaged over the cam portion on the driving plate and engaged between a pair of the engagement members on the table between each of the intermittent rotational movements, and the driving roller engaged between a pair of engagement members and the stop member engaged between a pair of the engagement members at the beginning of and at the end of each of the intermittent rotational movements of the driven table; whereby the driven table is at all times engaged through the engagement members by either the driving roller, the stop member, or both, and the movement of the stop member is positively controlled in both directions by the cam portion on the drive plate.

Figure 2:
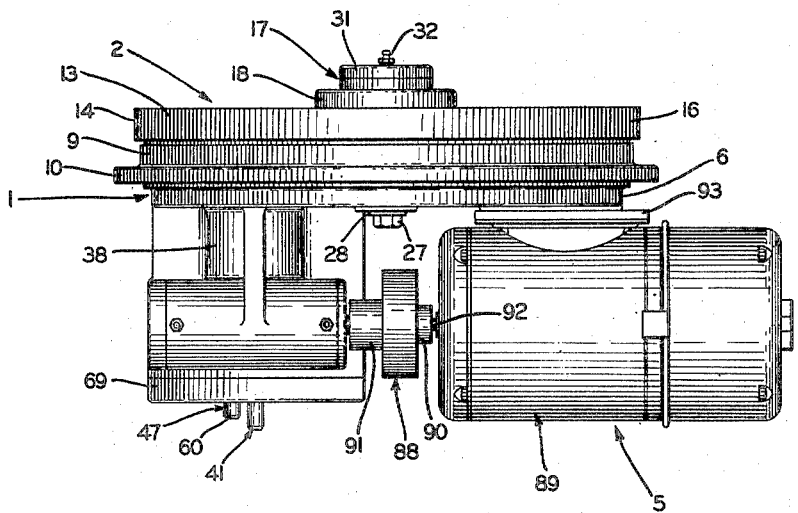
Figure 3:
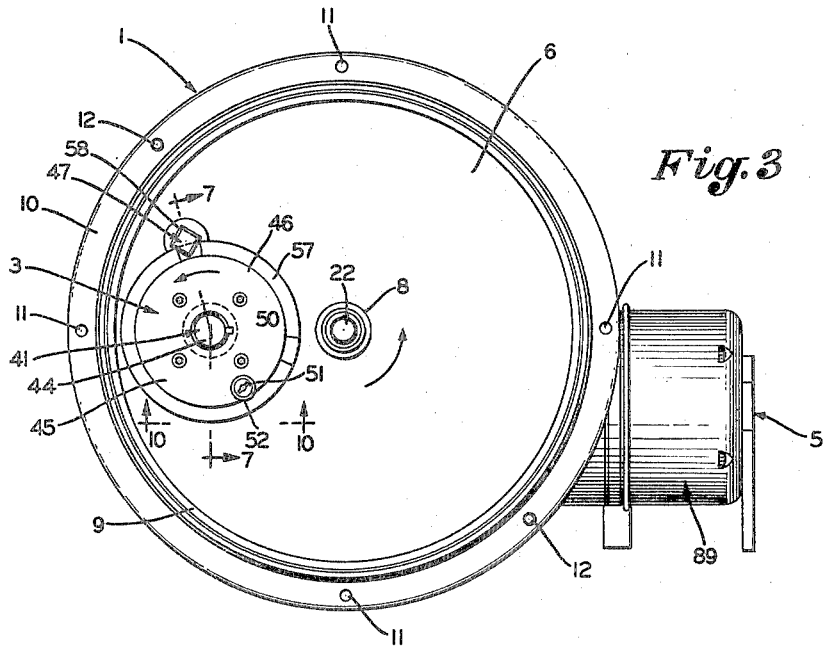
Figure 4:
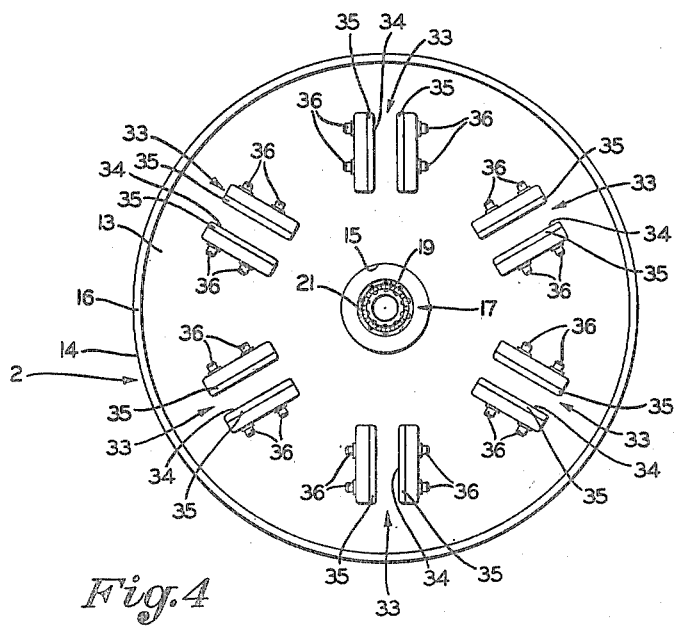
Figure 9:
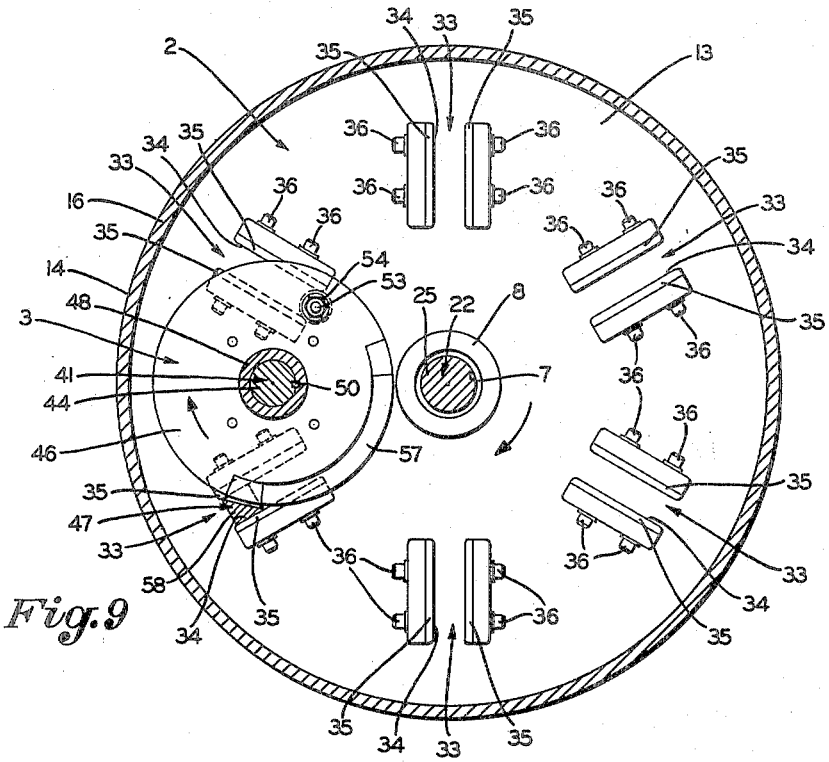
Figure 10:
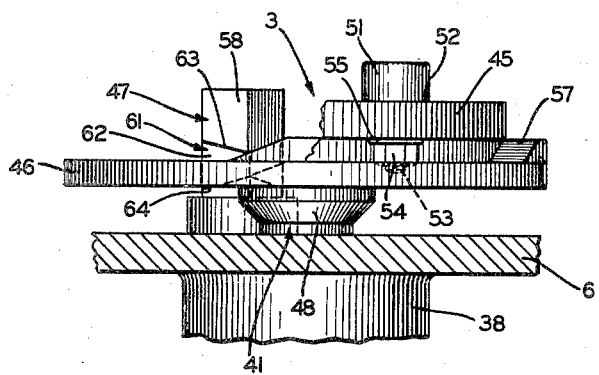
Figure 11:
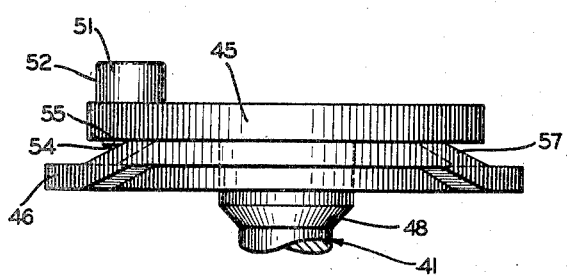

By way of example, an embodiment of the indexing table construction of the present invention is illustrated in the accompanying drawings forming a part hereof wherein like numerals indicate similar parts throughout the several views and in which:

Fig. 1 is a top elevation of the indexing table;

Fig. 2, a side elevation of the indexing table;

Fig. 3 a top elevation of the indexing table with the table portion removed;

Fig. 4, a bottom elevation of the table portion removed from the indexing table;

Fig. 5, an enlarged sectional view looking in the direction of the arrows 5—5 in Fig. 1;

Fig. 6, a fragmentary sectional view looking in the direction of the arrows 6—6 in Fig. 5;

Fig. 7, an enlarged fragmentary sectional view looking in the direction of the arrows 7—7 in Fig. 3 showing the stop member in disengaged position;

Fig. 8, a similar view to Fig. 7 showing the stop member in engaged position;

Fig. 9, a sectional view looking in the direction of the arrows 9—9 in Fig. 5;

Fig. 10, an enlarged fragmentary sectional view looking in the direction of the arrows 10—10 in Fig. 3; and Fig. 11, a side elevation of the cam and driving plate looking at the raised portion of the cam.

The indexing table construction comprising the present invention includes a mounting frame assembly generally indicated at 1, a table assembly generally indicated at 2, a driving plate and stop pin assembly generally indicated at 3, a worm gear drive assembly generally indicated at 4 and a drive means assembly generally indicated at 5. The various parts of the indexing table construction are made from various materials preferably including cast iron, steel, the usual ball or roller bearings and bronze or other suitable bushings.

The table and drive plate portion of the mounting frame 1 includes a generally horizontally extending, circular bottom plate portion 6 which has a centrally located indexing table center shaft opening 7. Opening 7 has upwardly extending sides 8 which form a sleeve extending upwardly at the center of the bottom plate portion 6. Outer sides 9 are connected to the outer annular periphery of the bottom plate portion 6 and have a horizontally extending flange portion 10 formed around their outer vertical surfaces. Mounting holes 11 and dowel pin holes 12 are formed in the horizontal flange portion 10, as best seen in Figs. 1, 3 and 5.

The table assembly 2 includes a generally horizontally extending table top portion 13 which has an annular outer periphery 14 and a centrally located opening 15. A downwardly extending vertical flange portion 16 is formed at the outer periphery of the table top 13. The bottom portion of the center bearing housing, generally indicated at 17, is received in the central opening 15 of the table top 12. The center bearing housing 17 is generally cylindrical in cross-section and has outwardly extending flanges 18 which abut the top edge of the table top 13. The table top 13 and the flange 18 are solidly connected by preferably cap screws or other usual fastening means.

The center bearing housing 17 also contains a circular bore 19 having an annular offset 20 formed spaced from the top and bottom sides of the housing 17. A roller bearing 21 is received in the annular offset 20 in the center bore 19. A vertically extending table center shaft, generally indicated at 22, is mounted in this roller bearing 21.

The center shaft 22 includes a bearing portion 23 and a frame mounting portion 24. The frame mounting portion 24 is larger in diameter than the bearing portion 23 and this mounting portion 24 includes a horizontally projecting flange portion 25 at its point of connection with the bearing portion 23. The mounting portion 23 is received in the center opening 7 formed in the bottom portion 6 of the mounting frame 1 by preferably a close slip fit so that the projecting portion 25 abuts the top surface of the vertical sides 8 of the mounting frame 1.

The lower end of the mounting portion 24 is formed of a smaller diameter on which is formed the threaded portion 26. A nut 27 and a washer 28 are received over the threaded portion 26 so that the washer 28 abuts the bottom surface of the bottom plate portion 6, thus solidly mounting the mounting portion 24 of the center shaft 22 in the opening 7.

The bearing portion 23 of the center shaft 22 is received through the bearing 21 above which the portion 23 is formed into a smaller diameter on which is formed the threaded portion 29. A nut 30 is received over the threaded portion 29 so that it abuts the top surface of the bearing 21, thus solidly mounting the table assembly 2 on the center shaft 22.

When the table assembly 2 is mounted on the center shaft 22, the bottom surface of the table top 13 is spaced from the top surface of the outer sides 9 of the mounting frame 1 and the downwardly extending flanges 16 are slightly spaced from the outermost annular surfaces of the sides 9.

A circular cover plate 31 is mounted on the top surface of the center bearing housing 17 so that it closes the bore 19 at its uppermost end. The bottom surface of the cover plate 31 is slightly spaced from the top end of the bearing portion 23 of the center shaft 22 and a grease fitting 32, preferably an Alemite fitting, is received centrally through the cover plate 31 so that the bearing 21 may ke kept properly greased. Thus, the table assembly 2 is rotatable around the center shaft 22 and over the mounting frame assembly 1.

Pairs of preferably rectangular radially extending engagement members 33 are mounted on the bottom surface of the table top 13 of the table assembly 2. These pairs of engagement members 33 are mounted equally spaced around the bottom of the table top 13, all being an equal distance from the center shaft 22 and spaced from the outer annular periphery 14 of the table top 13. Each pair of engagement members 33 are mounted in spaced apart relationship so that engagement openings 34 are formed centrally and radially extending through each pair of the engagement members.

Wear strips 35 are mounted on the inner surfaces of the engagement members 33 to form the outer sides of the engagement openings 34, as best seen in Figs. 4 and 9. These wear strips 35 are solidly connected to the engagement members 33 by preferably cap screws 36 for convenient removal and replacement.

A second opening 37 is formed in the bottom plate portion 6 of the mounting frame 1. This opening 37 is spaced from the center opening 7 and from the outer annular periphery of the bottom plate portion 6. Downwardly extending sides 38 are connected to the bottom plate 6 around the opening 37 continuing this opening 37 downwardly. Ball bearing 39 is mounted in the opening 37 abutting the bottom plate 6 and ball bearing 40 is mounted at the lower end of the opening 37 abutting the lower ends of the sides 38. The bearing spacer 39a is mounted between these bearings.

The driving plate mounting and driving shaft 41 is received through the bearings 39 and 40 and includes a gear mounting portion 42 extending below the bearing 40, a larger diameter bearing mounting portion 43 extending through and between the bearings 39 and 40 and a driving plate mounting portion 44 of slightly larger diameter than the bearing portion 43 and extending above the bearing 39. This portion 44 extends into the space formed between the bottom plate 6 of the mounting frame 1 and the table top 13 of the table assembly 2 and abuts the top surface of the bearing 39, as best seen in Figs. 1, 7 and 8.

The driving plate and stop pin assembly 3 is mounted on the driving plate mounting portion 44 of the shaft 41 spaced between the bottom plate portion 6 of the mounting frame 1 and the table top 13 of the table assembly 2. The driving plate and stop pin assembly 3 includes a driving plate 45, a cam plate 46, and a stop pin member or shot bolt 47.

The driving plate 45 is a preferably flat circular plate having a downwardly extending hub portion 48 and centrally located opening 49 formed through the plate and hub portion. The driving plate mounting portion 44 of the shaft 41 is received through the opening 49 in the plate 45 and the hub 48. Driving engagement is obtained between the shaft 41 and the driving plate 45 preferably by means of a key 50 received in keyways formed in the shaft 41 and the plate 45.

A driving roller 51 is mounted on the top horizontal surface of the driving plate 45 and slightly spaced from the outer annular periphery of the driving plate 45. The driving roller 51 is preferably of the cam follower type having an outer shell 52 which freely rotates around a mounting screw 53 which is received through the driving plate 45 and has a nut 54 and a washer 55 to retain it in place.

With the driving roller 51 mounted in place on the top surface of the driving plate 45 and the table top 13 mounted in place on the center shaft 22, the top surface of the driving roller 51 is slightly spaced from the bottom surface of the table top 13. Thus, the driving roller 51 is in the same horizontal plane and engageable with the pairs or sets of engagement members 33 mounted on the bottom horizontal surface of the table top 13.

The cam plate 46 also has an annular periphery but has a diameter slightly larger than the driving plate 45. The hub portion 48 of the driving plate 45 is received in an opening 56 formed centrally in the cam plate 46, mounting the cam plate 46, spaced below the driving plate 45 and in a generally horizontal position. There is a solid driving connection between the driving plate 45 and the cam plate 46.

The outer edge portion 57 of the cam plate 46 is raised for part of its circumferential length above the horizontal surface of the cam plate forming a cam surface on both the top and bottom surface of the outer edge portion 57 of the cam plate 46 as best seen in Figs. 10 and 11. In other words, the thickness of the cam plate 46 is substantially uniform throughout but with the edge portion 57 raised above the normal horizontal plane of the top of the cam plate for a portion of its circumference.

The stop pin 47 is circular in cross-section for a greater portion of its length and is mounted in a vertical position. This stop pin 47 includes a squared portion 58, a circular bearing portion 59 and a spring portion 60.

The opening 61, as seen in Figs. 3, 7, 8, 9 and 10, is formed diagonally through the squared portion 58 of the stop pin 47. The inner evertical side 62 of the opening 61 forms a diagonal between the opposite corners of the squared portion 58 and the top sides 63 and the bottom sides 64 of the opening 61 terminate at the corner of the squared portion 58 contained between these opposite corners.

The top side 63 is angled downwardly from one of the opposite corners inwardly to the center of the opening 61 and then is angled upwardly to the other opposite corner. The bottom side 64 is angled upwardly from one of the opposite corners to the center of the opening 61 and then downwardly to the other opposite corner. Thus viewing the opening 61 from the side, as it is shown in Figs. 7 and 8, the opening 61 is of decreasing height from its outermost edge to the center and then increases in height from the center to its other outermost edge. This configuration is shown in plan view in Fig. 10.

The angles on the top and bottom sides 63 and 64 are approximately the same as the angle at which the edge portion 57 of the cam plate 46 rises and falls. This cam edge portion 57 is received in the opening 61 of the stop pin 47 so that the outer annular periphery of the driving plate 45 is slightly spaced from the inner vertical side 62 of the opening 61. Thus, as the cam plate 46 is rotated, the stop pin 47 is forced upwardly and downwardly according to the cam edge portion 57.

The bearing portion 59 of the stop pin 47 is received through bushings 65 and 66 and spacer 67, which bushings and spacer are mounted in direct vertical alignment in the mounting frame 1. The spring portion 60 of the stop pin 47 extends vertically downward from the bearing portion 59 and is of a diameter slightly smaller than the bearing portion 59. This spring portion 60 extends through an opening 68 formed through the bottom cover plate 69 of the mounting frame 1.

The opening 68 is formed into a larger diameter portion 70 at its lowermost end and the seal 70a is received in this opening 68 around the end of the spring portion 60, with the spring portion 60 extending beyond the lowermost face of the cover plate 69.

The helical spring 71 is received around the spring portion 60 and bears at its top end against the lower end of the bearing portion 59 and at its lower end against the top face of the cover plate 69.

The worm gear 72 is mounted horizontally on the gear mounting portion 42 of the driving plate mounting shaft 41 with the shaft 41 being received through an opening 73 formed centrally in the worm gear 72. Driving engagement is obtained between the worm gear 72 and the driving shaft 41 preferably by means of a key 74 received in keyways formed in the opening 73 and the outer periphery of the driving shaft 41.

The gear mounting portion 42 of the driving shaft 41 extends vertically downward below the worm gear 72 and through an opening 75 also formed in the bottom cover plate 69. The opening 75 is also formed into a larger diameter portion 76 in which is received the seal 77 surrounding the gear mounting portion 42 of the driving shaft 41.

A threaded portion 78 is formed on the gear mounting portion 42 below the worm gear 72 and over this threaded portion 78 is received a lock nut 79 which lock nut 79 closely abuts the bottom surface of the worm gear 72 as shown in Figs. 5, 7 and 8. The gear mounting portion 42 of the driving shaft 41 also extends below the lowermost edge of the bottom cover plate 69.

Referring to Fig. 6, the worm 80 is mounted on a horizontal worm shaft 81, which in turn is rotatably mounted in the mounting frame 1 through bearings 82 and 83. The shaft 81 is mounted in substantially the same horizontal plane and adjacent the worm gear 72 so that the worm 80 is engaged with the worm gear 72.

The bearing spacer 84 is received over the worm shaft 81 between the end of the worm and the bearing 82 and the bearing spacer 85 is received over the worm shaft 81 between the opposite end of the worm and the bearing 83. The lock nut 86 is received over the end of the worm shaft 81 closely abutting the bearing 82. The other end of the worm shaft 81 extends from the bearing 83 through a seal 87, through the mounting frame 1 and is there connected into the drive means 5.

The drive means 5 includes a clutch member 88 and an electric motor 89. The clutch member 88 is preferably of the centrifugal type and has a driving member 90 and a driven member 91. The driven member 91 is connected to the end of the worm shaft 81 and the driving member 90 is connected to the center shaft 92 of the electric motor 89. The electric motor 89 also has a mounting frame 93 which is mounted to the bottom horizontal surface of the horizontal bottom plate portion 6 of the mounting frame 1.

In operation, the drive motor 89, through the clutch member 88, rotates the worm shaft 81. This causes the worm 80 to drive the worm gear 72 which in turn rotates the driving plate shaft 41. The rotation of the driving plate shaft 41 causes the driving plate 45 and the cam plate 46 to rotate. As the driving plate 45 is rotated, the driving roller 51 describes a circular path and since the stop pin 47 is engaged over the cam edge portion 57 of the cam plate 46, the stop pin 47 is forced upwardly and downwardly according to this cam surface 57.

The purpose of the spring 71 around the spring portion 60 of the stop pin 47 is to take up any small amount of clearance between the cam edge 57 of the cam plate 46 and the opening 61 in the stop pin 47. This spring 71 does not serve to drive the stop pin 47 in either vertical direction.

With the table assembly 2 mounted on the center shaft 22, the bottom surface of the table top 13 is spaced slightly from the upper horizontal edge of the sides 9 of the mounting frame 1 and the engagement members 33 are slightly spaced from the top of the driving plate 45. Thus, these engagement members 33 are on substantially the same horizontal plane as the driving roller 51 on the driving plate 45. The engagement openings 34 between each pair of engagement members 33 are of slightly greater width than the outer diameter of the outer shell 52 on the driving roller 51 so that the driving roller 51 may pass through these engagement openings 34.

The position of the table assembly 2, the driving roller 51, the outer cam surface 57, and the stop pin 47, as viewed in Fig. 9, is with the indexing table assembly 2 just beginning the start of its stationary position period with the driving plate 45 and the cam plate 46 rotating in a clockwise direction, as viewed from the bottom as in Fig. 9. At this point in the cycle, the driving roller 51 is slightly engaged between the engagement members 33 and the stop pin 47 is just beginning to engage between the next set of engagement members 33.

As the driving plate 45 and the cam plate 46 continue their rotation in a clockwise direction, the driving roller 51 will move away from the engagement members 33 and be disengaged from them. At the same time, the stop pin 47 will move vertically upward on the cam edge 57 of the cam plate 46 and will be fully engaged between the next set of engagement members 33. This will hold the indexing table assembly 2 in a stationary position.

The clockwise movement of the driving plate 45 and the cam plate 46 continues with the cam edge 57 sliding through the opening 61 in the stop pin 47 and with the stop pin 47 remaining engaged between the engagement members 33 for the length of the raised portion of the cam edge 57. At the point where the cam edge 57 again slopes downwardly, the stop pin 47 will start its downward movement, still remaining engaged at least partially between the engagement members 33. Also at this point the driving roller 51 will just start to come into engagement with the same set of engagement members 33. Before the stop pin 47 is completely disengaged from the engagement members 33, the driving roller 51 will be completely engaged with these engagement members.

As the clockwise motion of the driving plate 45 and the cam plate 46 continues, and the driving roller 51 continues in its circular path, the driving roller 51 will force the table top 13 of the table assembly 2 to also rotate in a clockwise direction, as viewed in Fig. 9. This clockwise motion of the table top 13 will continue until the driving roller 51 and the stop pin 47 are again in the same relative positions as shown in Fig. 9, at which point the table top 13 again goes into its stationary position period.

This cycle of intermittent rotational movements of the table top 13 spaced by the periods of stop position continues as long as the driving plate 45 and the cam plate 46 are rotated. If the rotational movement of the driving plate 45 and cam plate 46 is stopped, the table top 13 will remain in the particular position in which it happens to be at that point.

There is not any position during the cycle at which the table top 13 is free to be rotated by an outside force. One or two sets of the engagement members 33 are at all times engaged by either the driving roller 51 or the stop pin 57, or by both. For this reason, it is impossible for the table top 13 to ever move out of timing with the driving roller 51 and the stop pin 47.

The intermittent rotational movement of the table top 13 is obtained by a minimum amount of force being exerted from the driving plate 45, since the table assembly 2 contains the ball bearing 21 to give it free rotational movement. Also, the driving roller 51 is permitted to easily move through the openings 34 between the engagement members 33 due to the rotatable shell 52 on this roller 51.

The outer shell 52 of the driving roller 51 rolls along the wear strips 35 so that there is no sliding motion between the wear strips 35 and the driving roller 51. When, however, the wear strips 35 become worn to an extent that they require replacement, they may be easily removed and replaced by removing the cap screws 36. Additionally, since these wear strips 35 have a relatively small thickness and therefore can be fabricated from a small amount of material, they may be made of a high grade wear resistant steel alloy without greatly increasing the cost of the indexing table. In this way, the correct timing of the indexing table construction may always be maintained.

When this indexing table construction is used to move workpieces into position for drilling, or tapping or other similar operations, it is easily possible to time the operation of the drilling or tapping units with this indexing table construction. This may be done by mounting a micro-switch (not shown) on the bottom surface of the bottom cover plate 69 and in engagement with the lowermost end of the stop pin 47. This switch would be one that is normally on, that is, as the stop pin 47 is moved vertically upward to hold the stationary position of the table top 13, the switch would start the operation of the outside work unit, and as the stop pin 47 moves vertically downward, this switch would stop the operation of the outside work unit. In this way, as the table top 13 is stopped for its stationary position period, the operation of the outside work unit would be begun, and before the table top 13 again starts its intermittent rotational motion, the operation of the outside work unit would be stopped, giving complete automatic operation.

When the indexing table construction of the present invention is used in cooperation with various work units such as drilling or tapping machines, or both, it may be mounted in connection with these work units by means of bolts received through the bolt holes 11 in the flange portion 10 of the mounting frame 1. Workpieces upon which the various working operations are to be performed are held in work-holding fixtures, which fixtures are mounted on the top horizontal surface of the table top 13. The indexing table assembly is mounted in proper relation to the work units so that the stationary position periods of the table assembly 2 occur at the proper time to correctly position the work-holding fixtures in proper relation to the work units.

The indexing table assembly is properly aligned and held in place, between very close limits, by means of dowel pins received through the dowel pin holes 12 in the flange portion 10 of the mounting frame 1. Thus, once the indexing table construction is properly positioned in place it will always remain in such position, and due to the unique arrangement of elements imparting exact predetermined intermittent motions to the table assembly 2, the work fixtures mounted on the table top 13 will always be in proper position at all times, thereby eliminating any danger of accidental damage to workpieces, work fixtures or work units.

Thus the present invention provides an indexing table construction which is at all times positively engaged and can never be freely rotated by an accidental outside force; in which the stop pin or shot bolt is positively driven and is not at any time dependent on spring motion for its engagement or disengagement motion; in which the stop pin engages in the same slots as the driving roller so that the indexing table can never get out of timing; in which a single cam or drive plate assembly positively controls both the driving roller and the stop pin; and in which all of these unique features are provided in a simple and inexpensive but yet easily manufactured construction.

In the foregoing description, certain terms have been used for brevity, clearness and understanding, but no unnecessary limitations are to be implied therefrom, because such words are used for descriptive purposes herein and are intended to be broadly construed.

Moreover, the embodiment of the improved construction illustrated and described herein is by way of example, and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

I claim:

1. Indexing table construction including a rotatable table, engagement means mounted on the table, a driving plate assembly having a cam portion, a driving element mounted on the driving plate assembly and engageable with the engagement means on the table upon rotation of the driving plate assembly for rotating the table in successive predetermined increments, and stop means engaged with the cam portion on the driving plate assembly and engageable with the same driving element engagement means on the table upon rotation of the driving plate assembly for rigidly retaining the table against rotation between said increments of rotation.

2. Indexing table construction including a rotatable table, engagement means mounted on the table, a driving plate assembly having a cam portion, a driving roller mounted on the driving plate assembly and engageable with the engagement means on the table upon rotation of the driving plate assembly for rotating the table in successive predetermined increments, and a stop pin engaged with the cam portion on the driving plate assembly and engageable with the same driving roller engagement means on the table upon rotation of the driving plate assembly for rigidly retaining the table against rotation between said increments of rotation.

3. Indexing table construction including a rotatable table having a bottom surface, pairs of spaced radially extending engagement members mounted circumferentially equally spaced on the bottom surface of the table, a driving plate assembly having a cam portion, a driving element mounted on the driving plate assembly and engageable between the pairs of engagement members mounted on the table upon rotation of the driving plate assembly for rotating the table in successive predetermined increments, and stop means engaged with the cam portion on the driving plate assembly and engageable between the same pairs of engagement members on the table upon rotation of the driving plate assembly for rigidly retaining the table against rotation between said increments of rotation.

4. Indexing table construction including a rotatable table, engagement means mounted on the table, a driving plate assembly having a cam portion, a driving element mounted on the driving plate assembly and engageable with the engagement means on the table upon rotation of the driving plate assembly for rotating the table in successive predetermined increments, stop means having a slot formed therein, the cam portion of the driving plate assembly slidably mounted in the slot of the stop means, and the stop means engageable with the same driving element engagement means on the table upon rotation of the driving plate assembly for rigidly retaining the table against rotation between said increments of rotation.

5. Indexing table construction including a rotatable table having a bottom surface, pairs of spaced radially extending engagement members mounted circumferentially equally spaced on the bottom surface of the table, each of said pairs of engagement members forming a radially extending engagement slot therebetween, a driving plate assembly having a cam portion, a driving roller mounted on the driving plate assembly and engageable in the table engagement slots upon rotation of the driving plate assembly for rotating the table in successive predetermined increments, stop means having a slot formed therein, the cam portion of the driving plate assembly slidably mounted in the slot formed in the stop means, and the stop means engageable in the table engagement slots upon rotation of the driving plate assembly for rigidly retaining the table against rotation between said increments of rotation.

6. Indexing table construction including a rotatable table, engagement means mounted on the table, a driving plate assembly having an outer annular periphery, a cam portion formed in said outer annular periphery, said cam portion being of substantially uniform thickness throughout its circumferential length, a driving element mounted on the driving plate assembly and engageable with the engagement means on the table upon rotation of the driving plate assembly for rotating the table in successive predetermined increments, stop means having a slot formed therein, the cam portion of the driving plate assembly slidably mounted in the slot in the stop means, and the stop means engageable with the same driving element engagement means on the table upon rotation of the driving plate assembly for rigidly retaining the table against rotation between said increments of rotation.

7. Indexing table construction including a rotatable table having a bottom surface, pairs of spaced radially extending engagement members mounted circumferentially equally spaced on the bottom surface of the table, each of said pairs of engagement members forming an engagement slot therebetween, a driving plate assembly having an outer annular periphery, a cam portion formed on said outer annular periphery, said cam portion being of substantially uniform thickness throughout its circumferential length, a driving roller mounted on the driving plate assembly and engageable in the table engagement slots upon rotation of the driving plate assembly for rotating the table in successive predetermined increments, a stop pin having a slot formed therein, the cam portion of the driving plate assembly slidably mounted in the slot formed in the stop pin, and the stop pin engageable in the table engagement slots upon rotation of the driving plate assembly for rigidly retaining the table against rotation between said increments of rotation.

8. Indexing table construction including a rotatable table, engagement means mounted on the table, a driving plate assembly having a cam portion, said cam portion being of substantially uniform thickness throughout its length and having an upwardly angled portion and a downwardly angled portion, a driving element mounted on the driving plate assembly and engageable with the engagement means on the table upon rotation of the driving plate assembly for rotating the table in successive predetermined increments, a stop pin having a slot formed therein, said slot being of decreasing width from one side to the center of the stop pin and then being of increasing width from the center to the other opposite side of the stop pin forming upwardly angled top slot sides and downwardly angled bottom slot sides, the angles of the top and bottom slot sides being substantially equal to the angles of the upwardly and downwardly angled portions of the driving plate assembly cam portion, the cam portion of the driving plate assembly slidably mounted in the slot of the stop pin, and the stop pin engageable with the same driving element engagement means on the table upon rotation of the driving plate assembly for rigidly retaining the table against rotation between said increments of rotation.

9. Indexing table construction including a rotatable table having a bottom surface, pairs of spaced radially extending engagement members mounted circumferentially equally spaced on the bottom surface of the table, each of said pairs of engagement members forming an engagement slot therebetween, a driving plate assembly having an outer annular periphery, a cam portion formed on said outer annular periphery, said cam portion being of substantially uniform thickness throughout its circumferential length and having an upwardly angled portion and a downwardly angled portion, a driving roller mounted on the driving plate assembly and engageable in the table engagement slots upon rotation of the driving plate assembly, a stop pin having a slot formed therein, said stop pin slot being of decreasing width from one side to the center of the stop pin and then being of increasing width from the center to the other opposite side of the stop pin forming upwardly angled top slot sides and downwardly angled bottom slot sides, the angles of the top and bottom slot sides being substantially equal to the angles of the upwardly and downwardly angled portions of the driving plate assembly cam portion, the cam portion of the driving plate assembly slidably mounted in the slot of the stop pin, and the stop pin engageable in the same driving element table engagement slots upon rotation of the driving plate assembly for rigidly retaining the table against rotation between said increments of rotation.

10. Indexing table construction including a substantially horizontal circular rotatable table having a bottom surface, pairs of spaced radially extending engagement members mounted circumferentially equally spaced on the bottom surface of the table, each of said pairs of engagement members forming a radially extending engagement slot therebetween, a substantially horizontal circular driving plate having a top surface mounted vertically spaced below the bottom surface of the table, a driving roller mounted on the top surface of the driving plate and engageable in the table engagement slots upon rotation of the driving plate assembly to impart intermittent rotational movement to the table, a generally horizontal cam plate having an outer annular periphery mounted vertically spaced below the driving plate, a cam portion formed in said cam plate outer annular periphery, said cam portion being of substantially uniform thickness throughout its circumferential length, a vertical stop pin having a generally horizontal extending slot formed therein, the cam portion of the cam plate slidably mounted in the slot of the stop pin, said stop pin engaged in the engagement slots of the table between each of the intermittent rotational movements, and the driving roller engaged with the engagement slots of the table and the stop pin engaged with the engagement slots of the table at the beginning of and at the end of each of the intermittent rotational movements of the table; whereby the table is at all times engaged through the table engagement members by either the driving roller, the stop pin, or both, and the movement of the stop pin is positively controlled in both directions by the cam portion on the cam plate.

References Cited in the file of this patent

UNITED STATES PATENTS

| | | |
|---|---|---|
| 1,202,598 | Simpson | Oct. 24, 1916 |
| 1,994,995 | Holmes | Mar. 19, 1935 |
| 2,086,848 | Bullard | July 13, 1937 |
| 2,086,849 | Bullard | July 13, 1937 |

FOREIGN PATENTS

| | | |
|---|---|---|
| 104,928 | Great Britain | Mar. 26, 1917 |